United States Patent [19]
Nguyen et al.

[11] Patent Number: 5,889,986
[45] Date of Patent: Mar. 30, 1999

[54] INSTRUCTION FETCH UNIT INCLUDING INSTRUCTION BUFFER AND SECONDARY OR BRANCH TARGET BUFFER THAT TRANSFERS PREFETCHED INSTRUCTIONS TO THE INSTRUCTION BUFFER

[75] Inventors: Le Trong Nguyen, Monte Sereno; Heonchul Park, Cupertino, both of Calif.

[73] Assignee: Samsung Electronics Co., Ltd., Seoul, Rep. of Korea

[21] Appl. No.: 790,028

[22] Filed: Jan. 28, 1997

[51] Int. Cl.⁶ ...................................................... G06F 9/06
[52] U.S. Cl. ............................................................ 395/584
[58] Field of Search ..................... 364/DIG. 1, DIG. 2; 395/580, 581, 582, 583, 584, 585, 596, 587; 711/113, 118, 119, 120, 125, 127, 129, 162

[56] References Cited

U.S. PATENT DOCUMENTS 4,992,932  2/1991  Ohshima .................................. 395/584

Primary Examiner—Robert B. Harrell
Attorney, Agent, or Firm—Skjerven, Morrill, MacPherson, Franklin & Friel; David T. Millers

[57] ABSTRACT

An instruction fetch unit includes a program buffer for sequential instructions being decoded and a target buffer for an instruction sequence including the target of the next branch instruction. Scan logic coupled to the program buffer scans the program buffer for branch instructions. A target for the first branch instruction is determined and a request to external memory fills the target buffer with a sequence of instructions including a target instruction before sequential decoding reaches the branch instruction. If the branch is subsequently taken, the instructions from the branch target buffer are transferred to the program buffer. The program buffer may be divided into a main and a secondary buffer that have the same size as the target buffer, and an instruction bus between the instruction fetch unit and external memory is sufficiently wide to fill the main, secondary, or target buffer in a single write operation.

11 Claims, 3 Drawing Sheets

INSTRUCTION FETCH UNIT INCLUDING INSTRUCTION BUFFER AND SECONDARY OR BRANCH TARGET BUFFER THAT TRANSFERS PREFETCHED INSTRUCTIONS TO THE INSTRUCTION BUFFER

BACKGROUND OF THE INVENTION

1. Field of the Invention

This invention relates to processors and to circuits and methods for fetching instructions in order for execution.

2. Description of Related Art

An instruction fetch unit in a processor fetches instructions from memory for execution by an execution unit in the processor. Ideally, an instruction fetch unit obtains the instructions in program order, at a rate that avoids any idle time for the execution unit and therefore maximize processor performance. However, a high instruction fetch rate may be difficult to achieve because memory that stores instructions is often much slower than the execution unit.

Instruction caches provide a fast but small memory for instructions and can increase the speed of instruction fetches. However, with an instruction cache, a delay still occurs if there is a cache miss when fetching a desired instruction, for example, when sequential instruction execution or taking a branch in a program requires an instruction that is not currently in the instruction cache. When a cache miss occurs, the instruction cache accesses external memory. If there is a delay while the instruction cache accesses the external memory, the execution unit may be idle which degrades processor performance. Accordingly, instruction fetch units are sought which minimize delays that might otherwise occur as a result of a cache miss.

SUMMARY OF THE INVENTION

In accordance with an aspect of the invention, an instruction fetch unit includes a program buffer for an instruction sequence being decoded and a branch target buffer for an instruction sequence including the target of the next flow control instruction in the program buffer. Within a single clock cycle, scan logic coupled to the program buffer scans the program buffer for flow control instructions. When a flow control instruction is found, a target address for the flow control instruction is immediately determined, and an immediate request to the instruction memory such as an instruction cache system is made to fill the branch target buffer with an instruction sequence including the target instruction. Because the request for a target instruction sequence is typically made in advance of execution of the flow control instruction, the target instruction is often immediately available if the branch is taken.

In accordance with a further aspect of the invention, the program buffer includes a main buffer and a secondary buffer where the secondary buffer is for an instruction sequence that immediately follows the instruction sequence in the main buffer. Selection logic that transfers instructions from the instruction fetch unit to a decoder is coupled to the main buffer, and when a last instruction from the main buffer is transferred to the decoder, the instruction sequence from the secondary buffer is transferred to the main buffer to maintain a stream of instructions without delay for instruction memory access. Instructions can be prefetched into the secondary buffer while instructions are being transferred from the main buffer.

In accordance with yet a further aspect of the invention, the main buffer, the secondary buffer, and the branch target buffer all have the same storage capacity, and a bus between the buffers and instruction memory has a data width equal to the storage capacity of each buffer. Accordingly, any one of the main buffer, the secondary buffer, and the branch target buffer can be filled with instructions in a single clock cycle.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
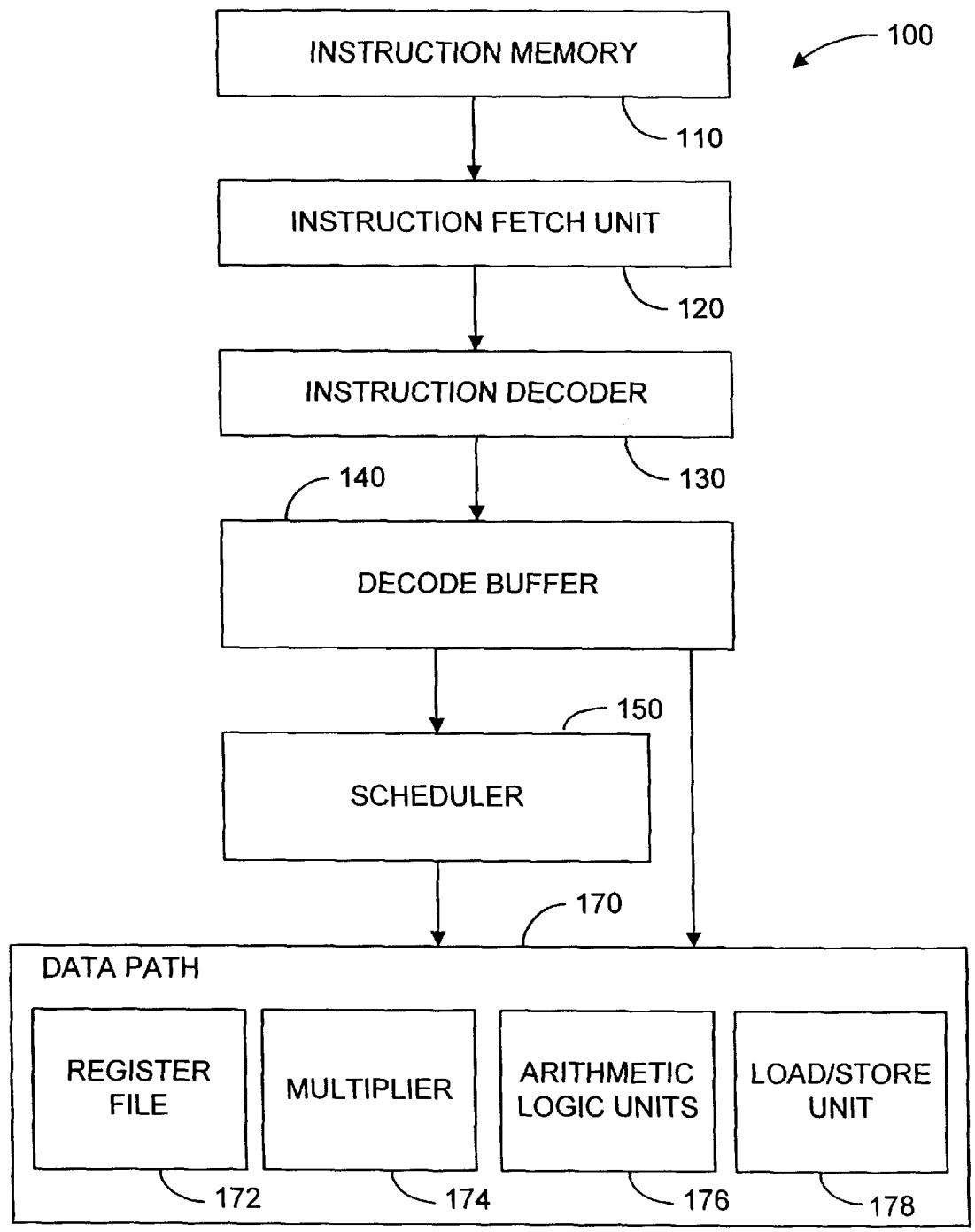
FIG. 1 is a block diagram of a processor in accordance with an embodiment of the invention.

In accordance with an aspect of the invention, an instruction fetch unit 120 for a processor 100 illustrated in FIG. 1 includes a program buffer and a branch target buffer. The program buffer is for a sequence of instructions including the instruction indicated by a program counter for an instruction decoder 130. The branch target buffer contains a sequence of instructions including an instruction at the target address of the next flow control instruction, if any, found in a sequence of instruction beginning at the program count for decoder 130. Scan logic detects flow control instructions in the program sequence and calculates the target address for the first flow control instruction encountered. Instructions including the instruction at the target address are prefetched from an instruction cache or other memory and loaded into the branch target buffer. If the next branch in the program sequence is taken, the instructions in the branch target buffer are used. For example, the instructions from the branch target buffer are transferred to the program buffer. If the branch is not taken, instructions from the program buffer are sequentially transferred to instruction decoder 130, and the scan logic searches for another flow control instruction. The branch target buffer reduces processor delay for flow control instructions because the target instructions for a branch taken are typically requested and ready before executing the flow control instruction.

In accordance with a further aspect of the invention, the program buffer includes a main buffer and a secondary buffer. If the main buffer is not empty, the main buffer contains an instruction sequence including the instruction corresponding to the program count, and the secondary buffer contains prefetched instructions that sequentially follow the instructions in the main buffer. When the last instruction in the main buffer is sent to decoder 130, the main buffer is empty, and the contents of the secondary buffer can be used. For example, the contents of the secondary buffer can be transferred to the main buffer or the main and secondary buffers can be swapped. The scan logic for the branch instruction detection may be coupled to the main buffer and the secondary buffer to find the next flow control instruction in the instruction sequences in the main and secondary buffers. Searching more instructions allows earlier detection of flow control instructions and provides more time for fetching the branch target instructions before execution of the branch instruction is required.

FIG. 1 shows functional blocks of processor 100 which includes instruction fetch unit (IFU) 120. IFU 120 fetches instructions from an instruction memory 110 that can be, for example, an instruction cache system. IFU 120 also processes flow control instructions such as conditional branches, subroutine calls, and returns, and provides instructions, other than some flow control instructions, to instruction decoder 130. Instruction decoder 130 decodes instructions in the order of arrival from IFU 120 (i.e. in program order) and fills entries of a decode buffer 140. Processor 100 further includes a scheduler 150 that issues operations from decode buffer 140 to a data path 170 that executes the instructions.

In accordance with an exemplary embodiment of the invention, instruction decoder 130 decodes up to one instruction per cycle and writes a set of single-cycle micro-instructions in an entry for the instruction. Scheduler 150 selects and issues micro-instructions to execution units including read and write ports of a register file 172, a multiplier 174, arithmetic logic units 176, and load/store unit 178 in execution data path 170. Co-filed U.S. patent application Ser. No. 08/789,574, entitled "Processor that Decodes a Multi-Cycle Instruction into Single-Cycle Micro-Instructions and Schedules Execution of the Micro-Instructions," describes instruction decoders, decode buffers, and schedulers suitable for the exemplary embodiment and is incorporated by reference herein in its entirety. Co-filed U.S. patent application Ser. No. 08/789,142, now U.S. Pat. No. 5,811,899, entitled "EXECUTION UNIT DATA PATHS FOR A VECTOR PROCESSOR," describes execution units suitable for the exemplary embodiment and is also incorporated by reference herein in its entirety. Co-filed U.S. patent application Ser. No. 08/789,575, entitled "LOAD AND STORE UNIT FOR A VECTOR PROCESSOR," describes load/store units suitable for the exemplary embodiment and is also incorporated by reference herein in its entirety.

Figure 2:
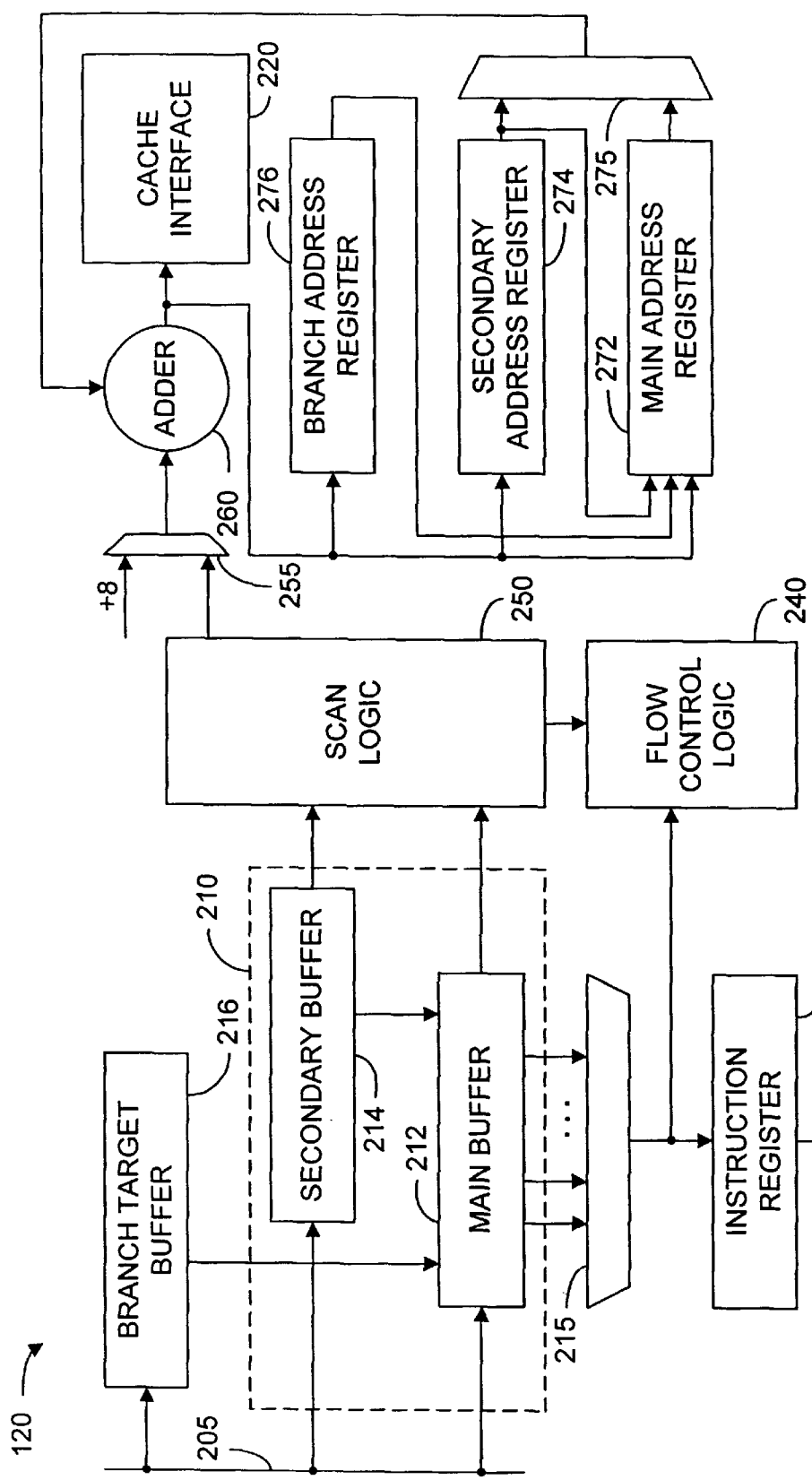
FIG. 2 is a block diagram of an instruction fetch unit in accordance with an embodiment of the invention.

FIG. 2 is a block diagram of an embodiment of IFU 120 that contains a program buffer 210 and a branch target buffer 216. Program buffer 210 stores an instruction sequence being decoded and is divided into a main buffer 212 and a secondary buffer 214. In the exemplary embodiment, processor 100 is a single-instruction-multiple-data (SIMD) processor that uses a RISC-type instruction set where each instruction is 32 bits long, and buffers 212, 214, and 216 are 8×32-bit buffers that connect to instruction memory 110 through a 256-bit instruction bus 205. IFU 120 can load eight instructions from instruction memory 110 and fill buffer 212, 214, or 216 in a single clock cycle.

Main buffer 212 is for an instruction sequence including the instruction corresponding to the program count for decoder 130. Secondary buffer 214 is for an instruction sequence that immediately follows the sequence in main buffer 212. Branch target buffer 216 is for an instruction sequence including the target of the next flow control instruction in buffer 212 or 214. Registers 272, 274, and 276 respectively indicate base addresses for the instruction sequences in buffers 212, 214, and 216.

A multiplexer 215 selects the next instruction in the program order if that instruction is in main buffer 212. If the next instruction is not a flow control instruction and if decoder 130 will be ready for the next instruction, the instruction is stored into an instruction register 230 at the start of the next clock cycle. Flow control logic 240 then increments the program count. Ideally, IFU 120 writes an instruction to register 230 at the start of each clock cycle and decoder 130 decodes one instruction per clock cycle.

After IFU 120 selects and processes the last of the instructions in main buffer 212, the next instruction sequence is loaded into main buffer 212 from secondary buffer 214, branch target buffer 216, or bus 205. If secondary buffer 214 is not empty when the last instruction from main buffer 212 is passed to decoder 130, the contents of buffer 214 and register 274 are moved to main buffer 212 and register 272, and IFU 120 requests the next instruction sequence from instruction memory 110 for secondary buffer 214. An adder 260 determines the base address of the next instruction sequence using the base address for main buffer 212 and a fixed offset (+8) indicating the capacity of main buffer 212 (or secondary buffer 214). The calculated address from adder 260 is stored in register 274 as the new base address for secondary buffer 214 and passed to a cache interface 110 for the request of the next instruction sequence. If the last instruction in main buffer 212 is processed before instruction memory 110 has returned the instruction sequence requested for secondary buffer 214, the instruction sequence from bus 205 is directly stored in main buffer 212 instead of secondary buffer 214, and the base address from register 274 is moved to register 272.

If the current instruction is a flow control instruction, flow control logic 230 processes all or part of the instruction. The flow control instruction is stored in register 230 for decoding by decoder 130 and additional processing in data path 170 if the instruction changes to a register value or requires an address read from a register. Otherwise, logic 240 processes the flow control instruction by evaluating a branch condition, if necessary, and updating the decode program counter.

In the exemplary embodiment, before evaluating a branch condition, flow control logic 240 waits until the program count for decoder 140 is equal to a program count indicating the last instruction completed by data path 170. If the branch is not taken, the program count for decoder 140 is incremented, and next instruction from program buffer 210 is selected as described above. If a branch is taken and branch target buffer 216 contains the target of the branch, the contents of branch target buffer 216 and register 276 are moved to main buffer 212 and register 272 so that IFU 120 can continue providing instructions to decoder 130 without waiting for instructions from instruction memory 110. IFU 120 then requests instructions for secondary buffer 214 based on the new base address in register 272 for main buffer 212 and searches for the next flow control instruction.

To prefetch instructions for branch target buffer 216, scan logic 250 scans buffers 212 and 214 to locate the next flow control instruction following the current program count. If a flow control instruction is found in buffer 212 or 214, scan logic 250 determines an offset from the base address for the buffer 212 or 214 containing the flow control instruction to the target of branch if taken. Multiplexers 255 and 275 provide the determined offset from scan logic 255 and the base address from register 272 or 274 to adder 260 which generates a new base address for branch target buffer 216. The new base address can either be the address of the target instruction or can be aligned to an even multiple of the capacity of buffer 216. The new base address is passed to cache interface 220 which requests an instruction sequence for branch target buffer 216.

Figure 3:
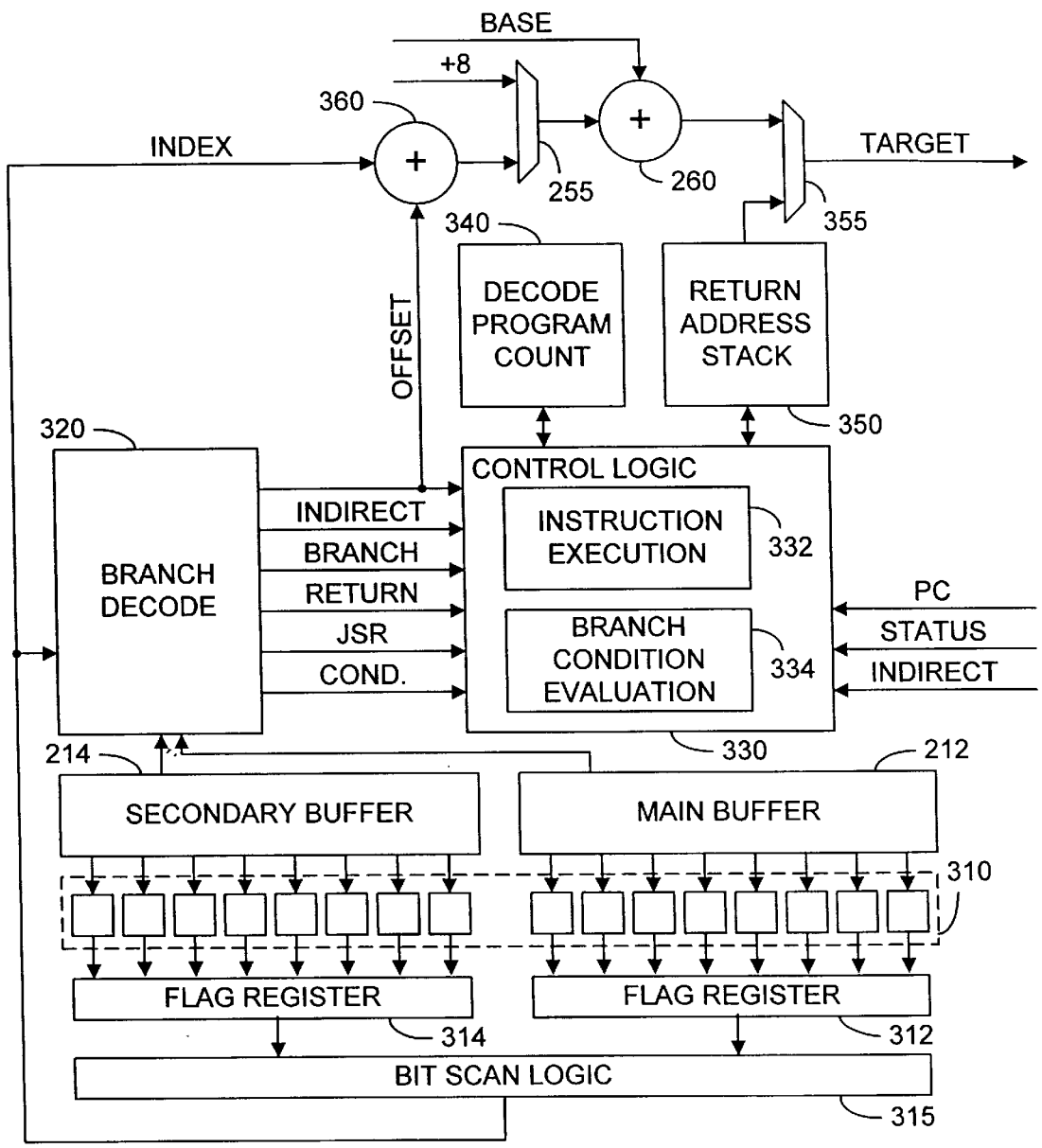
FIG. 3 is a block diagram of control and scan logic for the instruction fetch unit of FIG. 2.

FIG. 3 illustrates an embodiment of scan logic 250 and flow control logic 240 for instruction fetch unit 120. Scan logic 250 includes decoders 310 which operate in parallel. Each decoder 310 decodes an instruction in buffer 212 or 214 and sets a bit in flag registers 312 or 314 if the instruction decoded is a flow control instruction. Flow control instructions for an exemplary embodiment of have operation codes with a particular field value that is common to and unique to the flow control instructions. Decoders 310 test for the unique field value in each instruction.

Bit scan logic 315 generates a signal INDEX that indicates the position of the first set bit (the first flow control instruction) encountered in a scan direction. Bit scan logic 315 can be implemented using well known carry propagation circuits. In particular, in bit scan logic 315, a scan bit propagates in the direction of increasing program count until encountering a bit in register 312 or 314 that is set and kills (i.e. stops further propagation of) the scan bit. Signal INDEX identifies the bit that kills the scan bit. Look-ahead technique may be used if necessary to reduce gate delay in bit scan logic 315.

To prefetch target instructions, branch decode logic 320 decodes the flow control instruction at the location indicated by signal INDEX and extracts an offset if the instruction provides one. An adder 360 adds the offset from the instruction to the index from bit scan logic 315 to determine an offset from the base address of main buffer 312. Adder 260 then adds that offset to the base address and determines the target address for the flow control instruction. The target address is passed via a multiplexer 355 to cache interface 220 for a request for instructions to fill branch target buffer 216.

Flow control instructions that indicate a return from a subroutine call, halt or delay execution by processor 100, or use an indirect addressing mode do not provide an offset. For return instructions, multiplexer 355 selects the address from the top of a return address stack 350 as the target address that is sent to cache interface 220. Instructions that halt or delay execution do not have target addresses so that no prefetch to fill branch target buffer 216 is required. For a flow control instruction using indirect addressing, determination of the target address requires a value read from a register and cannot be completed until execution reaches the flow control instruction. Accordingly, no prefetch to fill branch target buffer is made for flow control instructions using an indirect address.

Decoder 320 also decodes flow control instructions for execution. Execution of a flow control instruction may involve IFU 120 alone in which case the flow control instruction is not passed to decoder 130, or may require operations by both IFU 120 and data path 170 in which case the instruction may be passed to data path 170 before or after flow control logic 240 executes part of the instructions. The operations performed by flow control logic 240 and data path 170 depend on the flow control instruction.

Generally, when a decode program count 340 reaches a flow control instruction, control logic 330 restricts further transfer of instructions to decoder 130 until an execution program count PC indicates data path 170 has completed the preceding instruction. At that point, a branch condition evaluation circuit 334 in control logic 330 compares a signal STATUS from a status register to the condition code from the flow control instruction to determine if a branch is taken.

If the branch is not taken, control logic 330 increments decode program count 340 to the address of the next instruction, clears the bit in flag register 312 associated with the flow control instruction, and sets branch target buffer 216 as empty. Scan logic 315 searches for a flow control instruction in buffers 212 and 214 (i.e. the next set bit in flag registers 312 and 314).

If the branch is taken, an instruction execution circuit 332 in control logic 330 initiates operations required to execute the flow control instruction. Such operations include: transferring the flow control instruction to decoder 130 if some action such as reading an address from a register for indirect addressing or changing a register value is required; pushing a return address onto or popping a return address from return address stack 350 for a call or return instruction; halting processor 100 if the instruction interrupts execution; updating decode program count 340 according to the offset or indirect address for the instruction; and moving the contents of branch target buffer 216 and register 276 to main buffer 212 and register 272.

For an exemplary embodiment of the invention, the flow control instructions include conditional branches (VCBR, VCBRI, VD1CBR, VD2CBR, and VD2CBR), subroutine calls (VCJSR, VCJSRI, and VCCS), a return instruction (VCRSR), and execution control instructions (VCINT, VCJOIN, and VCBARR). All of these instructions are conditional and are executed by control logic 330 only if a branch condition indicated in the instruction is satisfied. Some flow control instructions such as "decrement and conditional branch" instructions VD1CBR, VD2CBR, and VD3CBR change values in register file 160 in addition to changing the program count. Instructions such as VCBRI and VCJSRI use an indirect addressing and require a value read from a register. Accordingly, IFU 120 passes these instructions to decoder 130, and for instructions VCBRI and VCJSRI waits for a value returned from data path 170 before updating decode program count 340 and fetching the next instruction.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. An instruction fetch unit comprising:
 a first buffer:
 a second buffer:
 a selection circuit coupled to select and transfer instructions from the first buffer to a decoder;
 scan logic adapted to search the first buffer for flow control instructions;
 prefetch circuit coupled to the scan logic and the second buffer, wherein the prefetch circuit is adapted to fetch an instruction sequence including an instruction at a target address for a flow control instruction found by the scan logic and store the instruction sequence in the second buffer;
 a third buffer coupled to the first buffer; and
 a control circuit that transfers an instruction sequence from the third buffer to the first buffer in response to a last instruction being transferred from the first buffer to the decoder.

2. The instruction fetch unit of claim 1, wherein the first buffer has a storage capacity equal to that of the third buffer.

3. The instruction fetch unit of claim 2, wherein the prefetch circuit has an instruction bus with a data width equal to the storage capacity of the first buffer.

4. The instruction fetch unit of claim 1, wherein the prefetch circuit is coupled to the first and third buffer, and in response to the control circuit transferring the instruction sequence from the third buffer to the first buffer, the prefetch circuit request a next instruction sequence for storage in the third buffer.

5. A method for operating a processor, comprising:
 storing a first instruction sequence in a first buffer of an instruction fetch unit in the processor;

scanning the first instruction sequence in to identify a first flow control instruction;

determining a target address for the first flow control instruction;

sequentially processing instructions from the first buffer, wherein the sequential processing includes passing instructions to a decoder in a processor and determining whether a branch is taken for the first flow control instruction;

requesting a second instruction sequence before the sequential processing processes the first flow control instruction, wherein the second instruction sequence includes an instruction at the target address for the first flow control instruction;

receiving and storing the second instruction sequence in a second buffer in the instruction fetch unit;

transferring instructions from the second buffer to the first buffer if processing the first flow control instruction requires taking the branch; and discarding the second instruction sequence if processing the first flow control instruction requires not taking the branch.

6. The method of claim 5, wherein requesting the second instruction sequence comprises requesting instructions from an instruction cache.

7. The method of claim 5, further comprising processing instructions from the first buffer after transferring the second instruction sequence from the second buffer to the first buffer.

8. An instruction fetch unit comprising a first buffer;

a second buffer;

a selection circuit coupled to select and transfer instructions from the first buffer to a decoder;

scan logic adapted to search the first buffer for flow control instructions;

prefetch circuit coupled to the scan logic and the second buffer, wherein the prefetch circuit is adapted to fetch an instruction sequence including an instruction at a target address for a flow control instruction found by the scan logic and store the instruction sequence in the second buffer; and a branch condition evaluation circuit that determines whether a condition for taking a branch indicated by a flow control instruction is satisfied, wherein the second buffer is coupled to transfer the instruction sequence to the first buffer in response to the branch condition evaluation circuit indicating the branch is taken.

9. The instruction fetch unit of claim 8, further comprising:

a third buffer coupled to the first buffer; and a control circuit that transfers an instruction sequence from the third buffer to the first buffer in response to a last instruction being transferred from the first buffer to the decoder.

10. An instruction fetch unit comprising:

a first buffer;

a second buffer;

a selection circuit coupled to select and transfer instructions from the first buffer to a decoder;

a control circuit coupled to the first and second buffers, wherein the control circuit transfers an instruction sequence from the second buffer to the first buffer in response to the selection circuit transferring a last instruction from the first buffer to the decoder; and a prefetch circuit adapted to fetch an instruction sequence following the last instruction in the first buffer and to store the instruction sequence in the second buffer.

11. The processor of claim 10, wherein the prefetch circuit has an instruction bus with a data width equal to the storage capacity of the first buffer.

* * * * *